Patented May 12, 1936

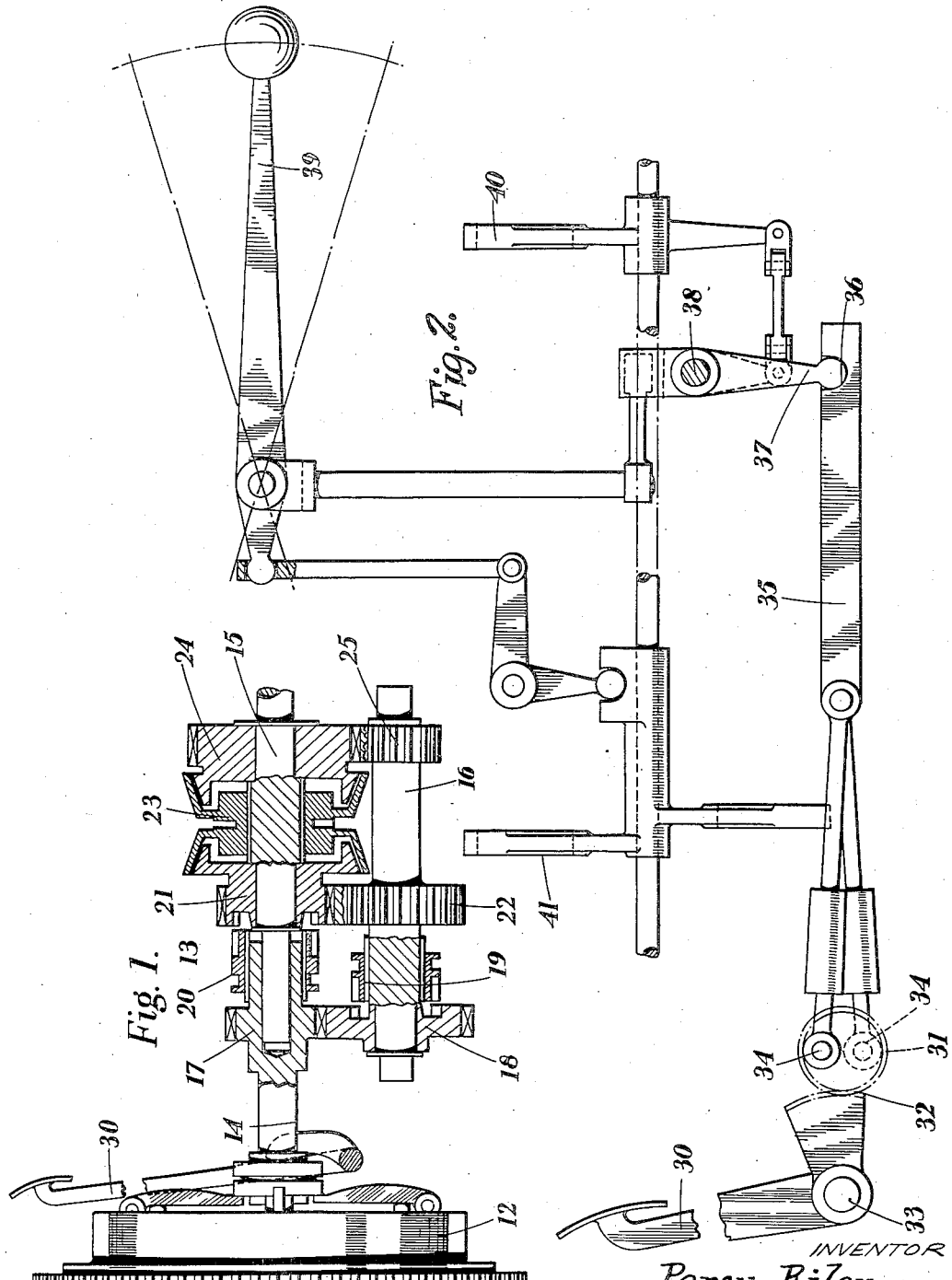

2,040,711

UNITED STATES PATENT OFFICE 2,040,711

TRANSMISSION AND CHANGE SPEED MECHANISM

Percy Riley, Coventry, England

Application October 12, 1934, Serial No. 748,121
In Great Britain October 12, 1933

3 Claims. (Cl. 74—334)

This invention relates to transmission mechanism, of the kind where a portion of a change-speed mechanism can be isolated by means of a main friction clutch and by means of another portion of the change-speed mechanism which is in series with the first and is of the "easy change" kind. The term "easy change" is herein used to mean either that different speeds in the portion of the mechanism in question are introduced by frictional means or, alternatively, the "easy change" portion may incude a gear mechanism, where the different speeds are introduced by dog clutches or by a sliding gear, in combination with a free-wheel or subsidiary clutch at the end of this gear mechanism remote from the main clutch.

The main object of the present invention is to provide for the control of the change-speed mechanism in an improved manner. At the present time, with ordinary change-speed mechanisms, the main control is usually a lever movable fore-and-aft and also laterally, sometimes through a gate. The main resistance to the movement of the lever is encountered only when it is being moved fore-and-aft and not when it is being moved laterally. It is my experience that the public do not like to encounter any material resistance when moving the lever laterally, and a further and particular object of the present invention is to arrange that in the control of a change-speed mechanism of the kind aforesaid no actuation of the change-speed mechanism will have to be effected whilst the lever is being moved laterally.

The invention broadly consists in connecting the "easy change" portion of the change-speed mechanism that is remote from the main friction clutch so that it will be actuated by the control for the latter.

In one practical method of carrying out the invention, the main friction clutch is released by depression of a clutch pedal in the known manner, this being associated with two side-by-side notched sliding rods such that the notches thereof are aligned with one another only when the clutch pedal is fully depressed to release the clutch. In these conditions a stem can be moved from one to another of the notches by lateral movement of the main control of the change-speed mechanism. On the release of the clutch pedal one rod is pushed and one rod is pulled, thus actuating the stem in one direction or the other according to which notch it was in. The stem is connected for actuating a double-acting clutching member of the "easy change" portion of the mechanism in opposite directions.

The two sliding rods may be mounted on oppositely-arranged eccentrics driven from the clutch pedal by means of a toothed quadrant and pinion connection. The eccentrics may take the form of diametrically-opposite pins carried by this pinion.

In the accompanying drawings, which are largely diagrammatic:—

Figure 1 is a part-sectional elevation of a transmission mechanism (including a main friction clutch) and one form of gear-box having two portions which operate in series with the clutch, that remote from the clutch being an "easy change" portion, to which the invention is applied;

Figure 2 is an elevation of one form of connection, according to the invention, between the main friction clutch and the "easy change" portion of the change-speed mechanism.

Figure 3:
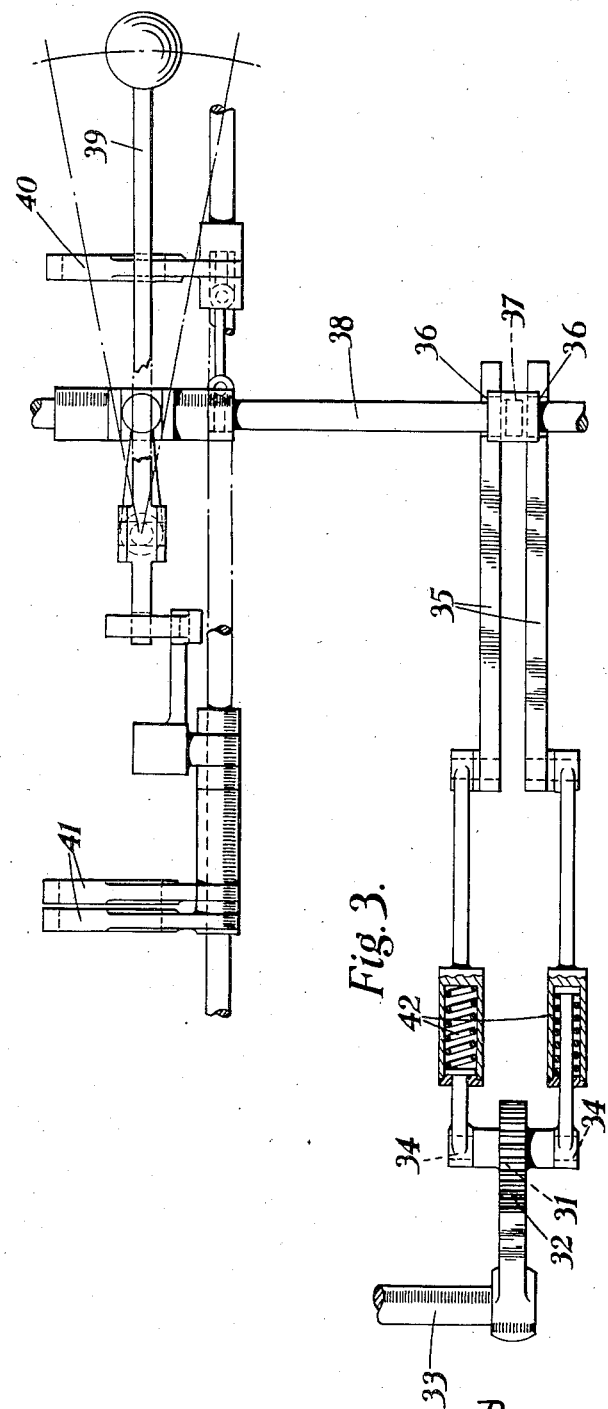
Figure 3 is a plan of this connection.

The main friction clutch 12 is interposed between the engine, not shown, and the change-speed mechanism 13. This latter has a driving shaft 14, a co-axial driven shaft 15 and a parallel layshaft 16. The driving shaft has a gear 17 fast on it in mesh with a gear 18 free on the layshaft and clutchable thereto by a splined sleeve 19. The driving shaft also carries a splined dog sleeve 20 movable to clutch to the driving shaft a gear 21 free on the driven shaft and in constant mesh with a gear 22 fast on the layshaft. The two dog sleeves in this instance move in unison, so that when either is in the clutching position the other is in the free position. The gear 21 free on the driven shaft can be frictionally clutched to it by one end of a double-acting clutching member 23 which in its other end position clutches another free gear 24 to the driven shaft, this free gear being in constant mesh with a gear 25 fast on the layshaft. The parts are shown as being in the neutral position.

As thus described, when both dog sleeves are moved to the right and the double-acting clutch member 23 to the left, when viewing the gear-box as in Figure 1, the gear 21 is frictionally clutched to the driven shaft and also positively clutched to the driving shaft, so that direct drive or top "speed" is obtained. For third "speed" the double-acting clutch member 23 is in the same position and both the dog sleeves in the left-hand position, when the drive is taken from the driving shaft direct to the layshaft and then back to the gear 21 which is still frictionally clutched to the driven shaft. For second "speed" the two dog sleeves are again in the right-hand position, thus locking the gear 21 to the driving shaft and transmitting through it the drive to the layshaft, and with the double-acting clutching member 23 in the right-hand position the gear 24 is locked to the driven shaft frictionally. For first "speed" the two dog sleeves are in the left-hand position and the double-acting clutching member in the right-hand position, the drive then being taken from the driving shaft direct through the length of the layshaft to the driven shaft through the gear 25 on the layshaft and the gear 24 on the driven shaft.

In each case, it will be noted, one dog clutch and one friction clutch has to be engaged for any of the forward speeds to be obtained, and always the dog clutch is interposed in the drive between the friction clutch and the main friction clutch 12 outside the gear-box. By moving any dog sleeve in engaging direction before the associated friction clutch in the interior of the gear-box is so moved, the dogs can always be silently engaged provided the main friction clutch is released as the part of the gear-box where the dogs are will then be isolated. The double-acting clutching member 23 constitutes the movable element of that portion of the gear-box previously referred to as an "easy change" portion.

In the arrangement of Figures 2 and 3 the main clutch pedal 30 is arranged to effect partial rotation of a pinion 31 in opposite directions, as by means of a toothed quadrant 32 engaging it and mounted on the pedal shaft 33, during depression and release. This pinion has connected to diametrically-opposite pins 34, 34 on it two side-by-side rods 35, 35 such that when the clutch pedal is fully depressed the diameter through the pins is at right-angles to the two rods. In these conditions notches 36, 36 in the rods are aligned with a stem 37 on a slidable and rotatable shaft 38, and through the stem the striking fork 40 for the double-acting clutching member 23 can be moved in one direction or the other. The stem can be slid, when the clutch pedal is fully depressed, into one or other of the notches 36 by lateral movement of the usual change-speed lever 39, this movement serving for selecting the direction in which the double-acting clutching member shall be moved but not effecting any movement of it. On the release of the clutch pedal one of the rods 35 will be pushed and the other pulled as the pinion is rotated through about 90°, the stem 37 being rotated to one side or the other according to which notch is engaged by it to effect engagement of the selected part of the double-acting clutching member.

(The change-speed lever may be connected in any convenient manner to operate the two dog sleeves when moved fore-and-aft, as illustrated by Figure 2. As stated, the dog sleeves, in the present instance always move in unison, having in fact, integral striking forks 41, 41. Obviously, however, this part of the control may be easily adapted for those cases where the two sliding dog members both move, say, to the right to effect engagement.)

Thus, when changing gear, the main friction clutch is first released, which results in the return of the double-acting clutching member 23 to the neutral position, so that the dog part of the mechanism is thereby isolated; the change-speed lever is then moved to the new gear position, when the appropriate dogs will be disengaged and engaged, and at the same time the direction in which the double-acting clutching member is to be moved is selected; but this clutching member, however, remains stationary until the main clutch pedal is released, when the the gear change is completed.

The change-speed lever may be supported from the facia board of the car to lie in a more or less horizontal plane (as illustrated) in which it is movable "through the gate" to select the different friction clutch part that is to be engaged, the lever also being movable in vertical planes (instead of the fore-and-aft) to the different gear position, i. e., to effect engagement of one or the other of the dog clutches.

Changing from top gear to third "speed", for example, on depression of the clutch pedal the dog clutches are isolated and the change-speed lever can then be moved silently to the new gear position, disengaging the one dog clutch and engaging the other. Third speed will be introduced on release of the clutch pedal. Going from third to second "speed", on depression of the clutch pedal the change-speed lever can again be moved silently to the new gear position, reversing the two dog clutches, and, whilst passing "through the gate", sliding the stem 37 from the notch 36 of one of the rods to that of the other. And so on.

A true neutral position is obtained when the change-speed lever is in the middle of the "gate" and the stem 37 is between the two rods 35 and not engaged in either of the notches 36, as is illustrated in Figure 3.

With the above arrangement the dog portion of the gear-box can be isolated by the release of the main friction clutch whilst the dogs are being engaged and disengaged with the result that silent gear changing becomes a very easy matter. Long life is insured as in a gear-changing operation the main load is taken up chiefly by the main friction clutch, which may be of any appropriate size for this work while the internal friction clutches of the "easy change" mechanism may be small ones. Moreover, the lateral movement of the change-speed lever is used only for selection purposes, the actuation of the "easy change" portion into engagement being effected by the engaging spring of the main friction clutch on the return of the clutch pedal.

When the gear-box illustrated is replaced by the combined gear-box and subsidiary clutch shown in the specification accompanying my co-pending patent application Serial No. 748,120, filed October 12, 1934, the rods 35 are for preference connected with the eccentric pins 34 through spring-pressed collapsible elements 42, 42 as shown so that the movement of the clutch pedal can never be prevented—for example, by dogs engaging end on.

What I claim as my invention and desire to secure by Letters Patent of the United States is:—

1. Transmission mechanism comprising a main friction clutch, two portions of a change-speed mechanism in series therewith, a main control for the two portions, the portion remote from the clutch having a double-acting slidable clutching member, and means connecting the latter with the main clutch whereby it will be automatically slid into neutral each time the main clutch is released and automatically engaged, in a direction dependent upon the position of the main control, as the main clutch is being engaged, said means including two similar notched rods arranged beside one another, a toothed quadrant carried by the main clutch control, a gear engaging the quadrant, eccentrically disposed pitmans carried by the gear and connected to the rods so that they will slide in opposite directions when the main clutch is actuated, and a stem co-acting with the notches.

2. Transmission mechanism comprising a main friction clutch, two portions of a change-speed mechanism in series therewith, a main control for the two portions, the portion remote from the clutch having a double-acting slidable clutching member, and means connecting the latter with the main clutch whereby it will be automatically slid into neutral each time the main clutch is released and automatically engaged, in a direction dependent upon the position of the main control, as the main clutch is being engaged, said means including two similar notched rods arranged beside one another, a toothed quadrant carried by the main clutch control, a gear engaging the quadrant, eccentrically disposed pitmans carried by the gear and connected to the rods so that they will slide in opposite directions when the main clutch is actuated, and a stem co-acting with the notches, said rods having their notches aligned with one another only when the main clutch is released the stem then being movable from one notch to the other for selection purposes.

3. In a transmission including selectable gear trains and a main clutch pedal, a secondary double acting clutching means, dog clutches associated with said gear trains, a shifting fork for the secondary clutching mean, shifting forks for said dog clutches, manually selectable means connected to said forks, an arm carried by said latter means, a pair of spaced apart notched rods, a quadrant connected to the main clutch pedal, a gear meshing with the quadrant, a pair of pitmans connected one to each rod, and means connecting the pitmans to opposed portions of said gear, said clutch pedal upon rocking thereof to declutching position moving said rods to a position whereby the notches therein will be in alined position, movement of said manually selectable means to a gear engaging position simultaneously moving said arm into one of said notches whereby release of said clutch pedal will simultaneously move said forks to engage the selected gear train.

PERCY RILEY.